United States Patent
Al-Essa et al.

(10) Patent No.: US 12,393,711 B2
(45) Date of Patent: Aug. 19, 2025

(54) SYSTEMS AND METHODS FOR DETERMINING QUARANTINE STATUSES OF OUTBOUND EMAILS

(71) Applicant: SAUDI ARABIAN OIL COMPANY, Dhahran (SA)

(72) Inventors: Abdullah T. Al-Essa, Dhahran (SA); Khalid H. Alqahtani, Dhahran (SA); Abdulrahman M. Alomar, Al Hasa (SA); Tariq S. Alshlash, Dhahran (SA); Saad F. Alanazi, Dhahran (SA); Mohammed S. Al-Logmani, Dhahran (SA); Norah A. Yousif, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 212 days.

(21) Appl. No.: 18/179,101

(22) Filed: Mar. 6, 2023

(65) Prior Publication Data
US 2024/0303357 A1 Sep. 12, 2024

(51) Int. Cl.
*H04L 9/00* (2022.01)
*G06F 21/62* (2013.01)
*H04L 9/40* (2022.01)
*H04L 51/212* (2022.01)

(52) U.S. Cl.
CPC ........ *G06F 21/6218* (2013.01); *H04L 51/212* (2022.05); *H04L 63/0245* (2013.01); *H04L 63/12* (2013.01)

(58) Field of Classification Search
CPC .............. G06F 21/6218; H04L 51/212; H04L 63/0245; H04L 63/12
See application file for complete search history.

(56) References Cited

U.S. PATENT DOCUMENTS

| 2014/0020044 | A1* | 1/2014 | Ayres ................. | G06F 21/6209 726/1 |
| 2022/0058288 | A1* | 2/2022 | Khurshid ............ | G06Q 10/107 |

* cited by examiner

*Primary Examiner* — Syed M Ahsan
(74) *Attorney, Agent, or Firm* — Vorys, Sater, Seymour and Pease LLP

(57) ABSTRACT

In some examples, a computer-readable medium storing an outbound email quarantine (OEQ) tool includes computer-executable instructions, which, when executed by a processor, cause the processor to prompt a designated reviewer to determine whether to permit transmission of an outbound email in response to a quarantine status of the outbound email indicating that the outbound email is quarantined, where the designated reviewer is determined based on characteristics of the outbound email; modify a header of the outbound email to bypass the one or more DLP policies in response to an indication from the designated reviewer to permit transmission of the outbound email; and transmit the outbound email having the modified header.

10 Claims, 4 Drawing Sheets

SYSTEMS AND METHODS FOR DETERMINING QUARANTINE STATUSES OF OUTBOUND EMAILS

FIELD OF THE DISCLOSURE

The present description relates generally to ensuring the security and protection of sensitive information of an organization and, more particularly, to systems and methods for determining whether to permit transmission of emails to intended recipients who are external to the organization.

BACKGROUND OF THE DISCLOSURE

Data of organizations includes sensitive information that, in the hands of malicious third parties, may be misused. The data may include personally identifiable information (PII), protected health information (PHI), financial information, intellectual property (IP) (e.g., trade secrets, state secrets, specifications, requirements, inventions, designs, formulas, manufacturing methods, source code, object code, databases, marketing techniques, blueprints), reports, pricing and costs, internal operations documents, or other information that is proprietary to the organization, not widely distributed, or not widely known to the public, for instance. An organization may use a data loss prevention, or data leakage protection, system (DLP system) to define policies that govern sharing, both internally and externally, of sensitive information. The DLP system is a cybersecurity solution that mitigates risk of exposure of sensitive information to unauthorized parties. The DLP system may classify the sensitive data and perform different actions based on the classification, for instance.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the purpose of this summary is to present some concepts of the disclosure in a simplified form prior to the more detailed description that is presented hereinafter.

According to an embodiment of the present disclosure, a computer-readable medium storing an outbound email quarantine (OEQ) tool includes computer-executable instructions, which, when executed by a processor, cause the processor to prompt a designated reviewer to determine whether to permit transmission of an outbound email in response to a quarantine status of the outbound email indicating that the outbound email is quarantined, where the designated reviewer is determined based on characteristics of the outbound email; modify a header of the outbound email to bypass the one or more DLP policies in response to an indication from the designated reviewer to permit transmission of the outbound email; and transmit the outbound email having the modified header.

In another embodiment of the present disclosure, a method includes prompting a designated reviewer to determine whether to permit transmission of an outbound email in response to a quarantine status indicating that the outbound email is quarantined, where the designated reviewer is determined based on a characteristic of the outbound email; modifying a header of the outbound email to bypass the one or more DLP policies in response to an indication from the designated reviewer to permit transmission of the outbound email; and transmitting the outbound email having the modified header.

In another embodiment of the present disclosure, a system includes a data loss prevention (DLP) server, implemented by the at least one processor, to provide access to one or more DLP policies, and a service account server, implemented by at least one processor, to transmit an outbound email having a modified header to bypass the one or more DLP policies in response to an indication from a designated reviewer to permit transmission of the outbound email having a quarantine status indicating that the outbound email is quarantined, wherein the designated reviewer is determined based on a characteristic of the outbound email.

Any combinations of the various embodiments and implementations described herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
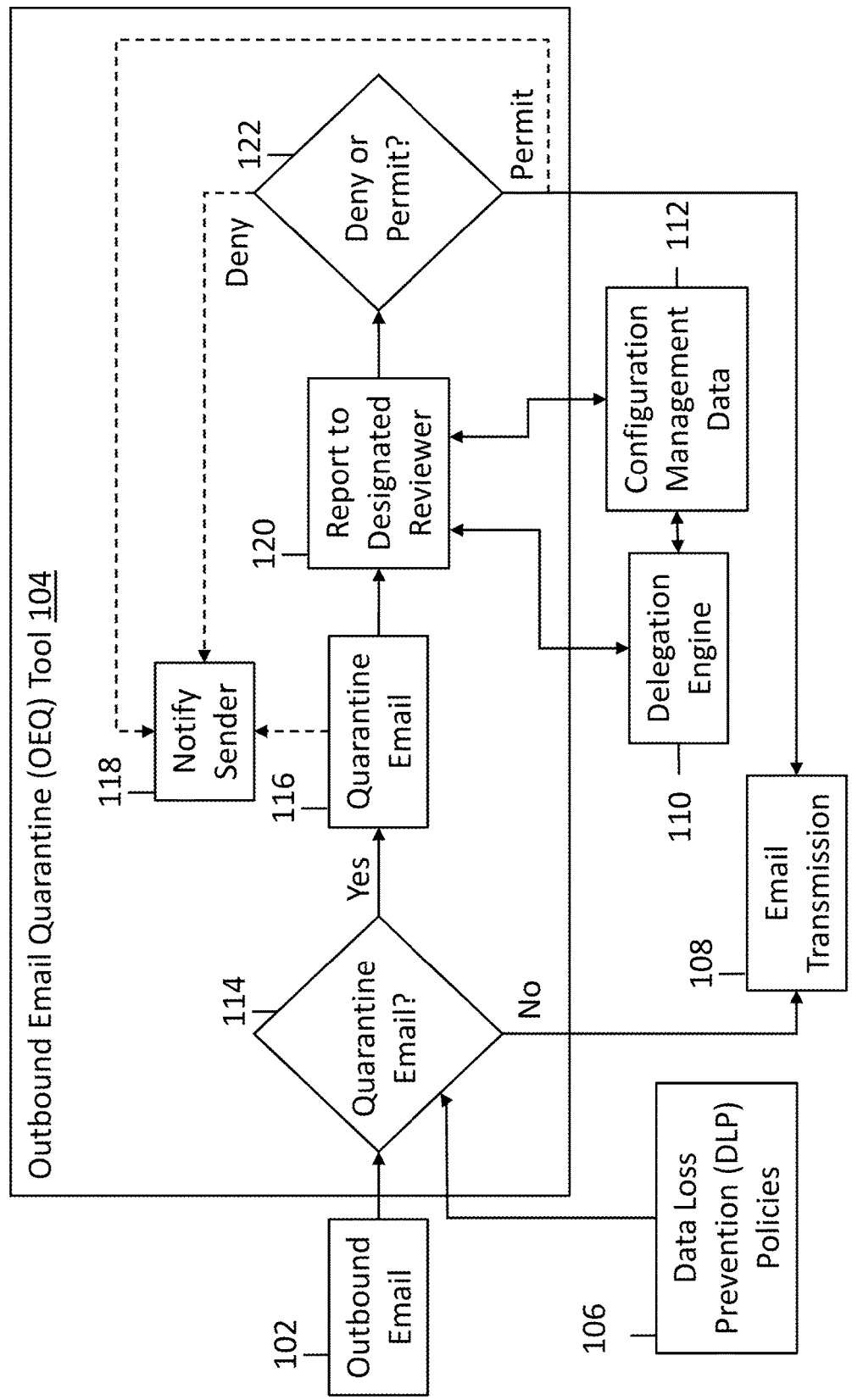
FIG. 1 is a block diagram of a system determining quarantine statuses of outbound emails, in accordance with certain embodiments.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments described herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to ensuring the security and protection of sensitive information of an organization and, more particularly, to systems and methods for determining whether to permit transmission of emails to intended recipients who are external to the organization.

According to various embodiments, an outbound email quarantine (OEQ) tool determines a quarantine status of an outbound email sent by a user of an organization. An outbound email, as used herein, refers to an email having at least one intended recipient who is external to the organization. The OEQ tool compares characteristics of the outbound email to one or more data loss prevention (DLP) policies of the organization to determine whether to quarantine the outbound email. The characteristics of the outbound email includes, but are not limited to, a sender of the outbound email, one or more departments or groups associated with the sender, content of the outbound email, one or more intended recipients of the outbound email, source internet protocol (IP) address, destination IP address, or a combination thereof. In certain embodiments, the OEQ tool determines a classification, or level of sensitivity, of the outbound email based on the characteristics and compares the characteristics of the outbound email to a subset of DLP policies associated with the classification to determine whether to quarantine the outbound email. A department or group associated with the sender is designated by the organization. The content includes, but is not limited to, data disclosed within a subject, a body, an attachment, or the like, of the outbound email. The one or more data loss prevention (DLP) policies specify a type of data to be protected (e.g., personally identifiable information (PII), protected health information (PHI), financial information, intellectual property (IP), reports, pricing and costs, internal operations documents, or other proprietary information), one or more locations storing the data, storage accessibility permissions associated with the data, one or more actions to be taken if unauthorized access or use of the data occurs, one or more responsible parties to perform the one or more actions, or the like. The one or more DLP policies may include, but are not limited to, classification-based policies, such as policies associated with confidential, restricted, or government confidential classified data. The DLP policies may include one or more sets of dictionaries. The one or more sets of dictionaries include keywords, email characteristics, policies, or a combination thereof, defining different classifications, controls to enact in response to a classification, or the like.

In response to a determination that the quarantine status indicates that the outbound email is unquarantined, the OEQ tool enables transmission of the outbound email. In response to a determination that the quarantine status indicates that the outbound email is quarantined, the OEQ tool prompts a designated reviewer to determine whether to permit transmission of the outbound email. The designated reviewer is a user having security privileges that enable them to decide whether to override DLP polies. The designated reviewer may be a supervisor of the sender, a department or group head for the sender's department or group, a system administrator, or a like stakeholder in safeguarding sensitive information. In certain embodiments, the designated reviewer can automate reviews of the sender's outbound emails by whitelisting the sender. In response to an indication from the designated reviewer to permit transmission of the outbound email, the OEQ tool modifies a header of the outbound email to bypass the one or more DLP policies and transmits the outbound email having the modified header. In some examples, the OEQ tool transmits a notification to the sender that includes the quarantine status of the outbound email. By quarantining outbound emails that contravene one or more DLP policies, the OEQ tool enforces cybersecurity policies of the organization that protect sensitive or confidential information of an organization by preventing unauthorized disclosure of the sensitive or confidential information, whether malicious or accidental. The OEQ tool enabling a designated reviewer to permit transmissions of outbound emails initially flagged as quarantined provides a flexibility that facilitates operations.

FIG. 1 is a block diagram of a system 100 for determining quarantine statuses of outbound emails, in accordance with certain embodiments. In a non-limiting example, the system 100 includes an OEQ tool 104 for determining quarantine statuses of an outbound email 102. The quarantine statuses indicate whether to permit or deny transmission of the outbound email 102. The quarantine statuses may include, but are not limited to, indicators indicating an outbound email is quarantined, unquarantined, cleared, or the like. The indicators may be any logical designation (e.g., colors, alphanumeric values, numeric values, word values, or the like) specified by an owner or administrator of the OEQ tool 104. The system 100 is a portion of one or more networks used by an organization, for example. In a non-limiting example, the system 100 includes one or more systems, as described with respect to FIG. 4, that communicate via a combination of local and remote networks, such as in a distributed system that is hosted, completely or in part, in the cloud. In a non-limiting example, the OEQ tool 104 includes one or more of a DLP server and an account service server, as described herein with respect to FIG. 3. Using data from different sources such as the outbound email 102, DLP policies 106, a delegation engine 110, configuration management data 112, or the like, the OEQ tool 104 can determine whether transmission of the outbound email 102 is permitted by the DLP policies 106 or by a designated reviewer. In response to a determination that the outbound email may be transmitted, the OEQ tool 104 enables transmission of the outbound email as the email transmission 108. Enabling transmission, as used herein, refers to permitting the outbound email through a gateway to networks external to the organization (e.g., the internet). In a non-limiting example, the gateway is a Boolean-controlled detection device. In response to detecting a flag, or other indicator, indicating that the outbound email may be transmitted, the gateway permits the outbound email to transmit. In response to detecting a flag, or other indicator, indicating that the outbound email may not be transmitted, the gateway prevents transmission of the outbound email.

In a non-limiting example, the OEQ tool 104 receives the outbound email 102. The OEQ tool 104 determines whether to quarantine the email. For example, at 114, to determine a quarantine status, the OEQ tool 104 compares characteristics of the outbound email to the DLP policies 106. In a non-limiting example, the DLP policies 106 is stored as one or more databases to computer-readable media, as described with respect to FIG. 4. The DLP policies 106 may include one or more DLP policies. In response to the characteristics of the outbound email complying with the DLP policies 106, the OEQ tool 104 enables transmission of the outbound email 102 as the email transmission 108. For example, the OEQ tool 104 modifies the quarantine status to indicate that the outbound email is unquarantined in response to a determination that the characteristics of the outbound email are permitted by the DLP policies 106.

In response to one or more of the characteristics of the outbound email contravening at least one of the DLP policies 106, the OEQ tool 104 quarantines the outbound email. For example, at 116, the OEQ tool 104 modifies the quarantine status of the outbound email to indicate that the outbound email is quarantined. In some examples, at 118, the OEQ tool 104 transmits a notification to a sender of outbound email in response to a modification of the quarantine status. The notification may include the quarantine status of the outbound email, one or more actions available to the sender based on the quarantine status, an identity of the designated reviewer for the outbound email, or a combination thereof. For example, the notification may include a prompt that enables the sender to request to be added to a whitelist. The whitelist is a DLP policy of the DLP policies 106, for example. In response to receiving the request, the OEQ tool 104 transmits the request to the designated reviewer. In response to the designated reviewer approving the request, the OEQ tool 104 modifies the quarantine status to indicate that the outbound email is unquarantined, which enables transmission of the outbound email without the modified header, for example. In a non-limiting example, upon receipt of a second outbound email, the OEQ tool 104 determines whether the whitelist includes identifying information associated with the sender of the second outbound email. In response to a determination that the whitelist includes the identifying information, the OEQ tool 104 sets the quarantine status to cleared to bypass the remaining DLP policies. In response to a determination that the whitelist does not include the identifier, the OEQ tool 104 continues at 114. In a non-limiting example, the OEQ tool 104 tracks a number of instances in which transmissions of a specified user's outbound emails are permitted by the designated reviewer. In response to the number of instances exceeding a threshold, the OEQ tool 104 may prompt the designated reviewer to add the sender to the whitelist. By enabling whitelisting, the OEQ tool 104 provides a flexibility that facilitates operations for users who communicate with external parties and are entrusted by the designated reviewer to operate in accordance with DLP policies 106 independently of review.

In response to the quarantine status indicating that the outbound email is quarantined, the OEQ tool 104 prompts the designated reviewer to determine whether to permit transmission of the outbound email. In a non-limiting example, the OEQ tool 104 retrieves identifying information of the designated reviewer from the configuration management data 112 based on identifying information of the sender of the outbound email. In a non-limiting example, the configuration management data 112 is stored as one or more databases to computer-readable media, as described with respect to FIG. 4. The configuration management data 112 includes data describing relationships between users of the organization, roles attributed to each of the users (e.g., designated reviewer, department member, group member, or the like), data permissions assigned to each of the users, or a combination thereof. Identifying information may include a username, an identifier assigned by the organization, an email, or other like information that distinguishes different users of the organization.

In response to an indication from the designated reviewer to permit transmission of the outbound email, the OEQ tool 104 modifies a header of the outbound email to bypass the DLP policies 106. In a non-limiting example, the OEQ tool 104 enables transmission of the outbound email having the modified header. For example, the OEQ tool 104 modifies the quarantine status to indicate that the outbound email is cleared to bypass the DLP policies 106. In a non-limiting example, in response to a modification to the quarantine status, the OEQ tool 104 transmits a notification including the quarantine status to the sender. The notification may also include one or more actions available to the sender based on the quarantine status, an identity of the designated reviewer for the outbound email, or a combination thereof. In response to an indication from the designated reviewer to deny transmission of the outbound email, the OEQ tool 104 may transmit a notification to a sender. The notification may include the quarantine status of the outbound email, one or more actions available to the sender based on the quarantine status, an identity of the designated reviewer for the outbound email, or a combination thereof.

In a non-limiting example, in response to the indication from the designated reviewer to permit transmission of the outbound email, the OEQ tool 104 duplicates the outbound email, modifies a header of the duplicate to bypass the DLP policies 106, and transmits the duplicate as the outbound email using an impersonation privilege. Transmitting the duplicate having the modified header as the outbound email and using the impersonation privilege enables the OEQ tool 104 to determine that the outbound email complies with the DLP policies 106 at 114 and enables transmission of the duplicate as the email transmission 108. Duplicating the outbound email eliminates additional storage and processing used in maintaining a transmission queue that is dependent upon timestamps and thresholds.

In a non-limiting example, the prompt to the designated reviewer to determine whether to permit transmission of the outbound email includes a graphical user interface that enables the designated reviewer to select a second designated reviewer. The second designated reviewer may be an immediate manager of the sender or a user who is more familiar with day-to-day activities of the sender, for example. In a non-limiting example, in response to receiving an indication that the designated reviewer has selected the second designated reviewer from a list of authorized designated users displayed in the prompt, the OEQ tool 104 may transmit identifying information of the second designated reviewer to the delegation engine 110 to store the second designated reviewer as associated with the sender to the configuration management data 112. In another non-limiting example, in response to the designated reviewer interacting with the graphical user interface to indicate an intent to select the second designated reviewer, the delegation engine 110 may cause a second graphical user interface to display, where the second graphical user interface enables the designated reviewer to select the second designated reviewer. In response to receiving a second outbound email sent by the sender, the OEQ tool 104 may notify the second designated reviewer instead of, or in addition to, the original designated reviewer.

In another non-limiting example, the prompt to the designated reviewer to determine whether to permit transmission of the outbound email includes a graphical user interface that enables the designated reviewer to automate the reviewer role. For example, the designated reviewer may be an immediate manager of the sender or a user familiar with day-to-day activities of the sender. Based on the familiarity, the designated reviewer may indicate that the sender be added to a whitelist. The OEQ tool 104 may modify the whitelist to include the sender in response to the indication from the designated reviewer to perform the addition.

Figure 4:
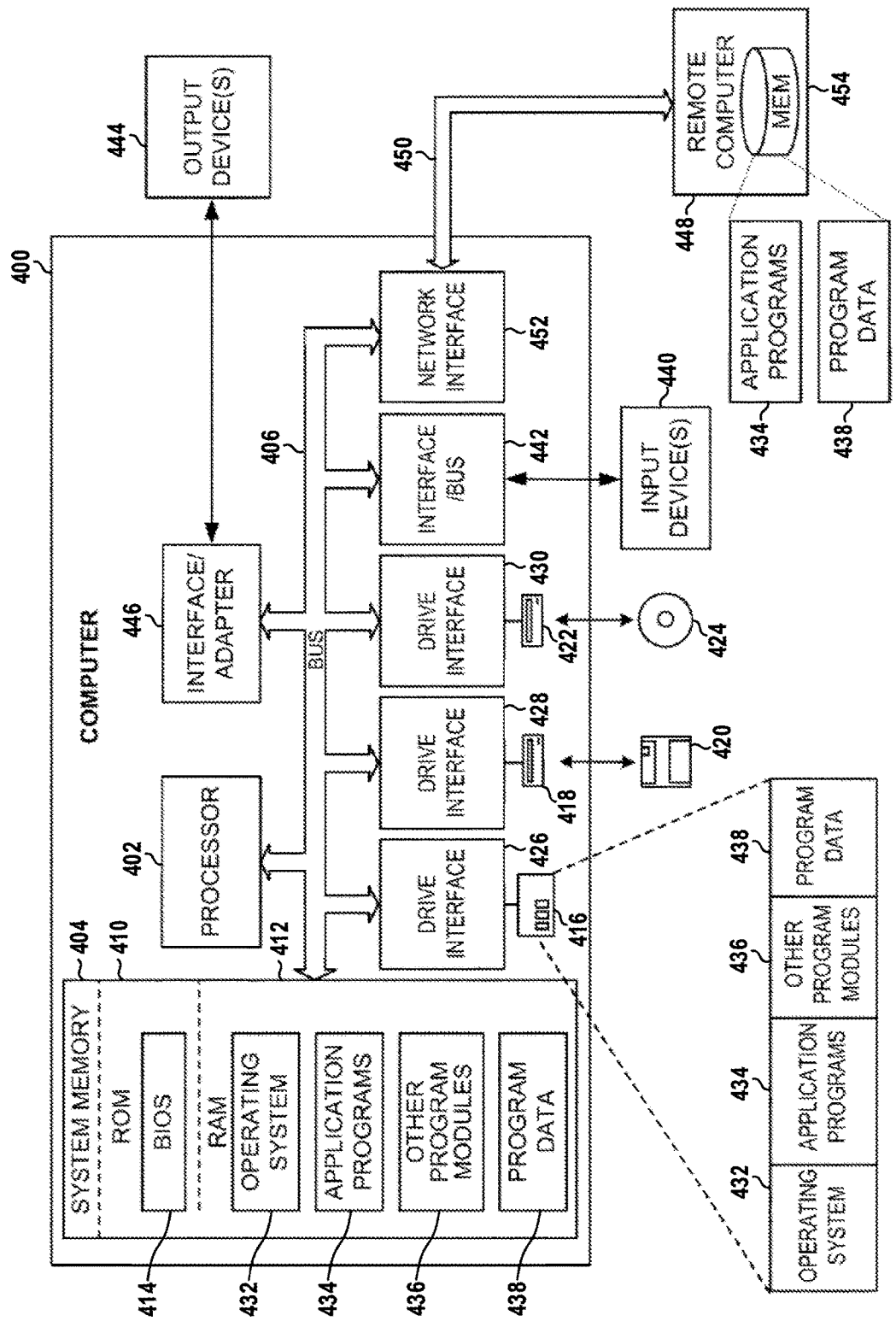
FIG. 4 is a block diagram of a computer system that can be employed to execute a system for determining quarantine statuses of outbound emails, in accordance with certain embodiments.

In a non-limiting example, in response to receiving an indication that an email is an outbound email from another system communicatively coupled to the OEQ tool 104, the OEQ tool 104 retrieves the outbound email 102 from a computer-readable media, such as described with respect to FIG. 4. Once retrieved from the computer-readable media, the outbound email 102 may be deleted from the computer-readable media. For example, the computer-readable media may be a transmission queue of the another system communicatively coupled to the OEQ tool 104. In another non-limiting example, the outbound email 102 is received by the OEQ tool 104 via an input device, as described with respect to FIG. 4, or via a network interface, as described with respect to FIG. 4. One or more outputs of the OEQ tool 104 may be stored to a computer-readable media, such as a database storing the DLP policies 106 or the configuration management data 112.

Figure 2:
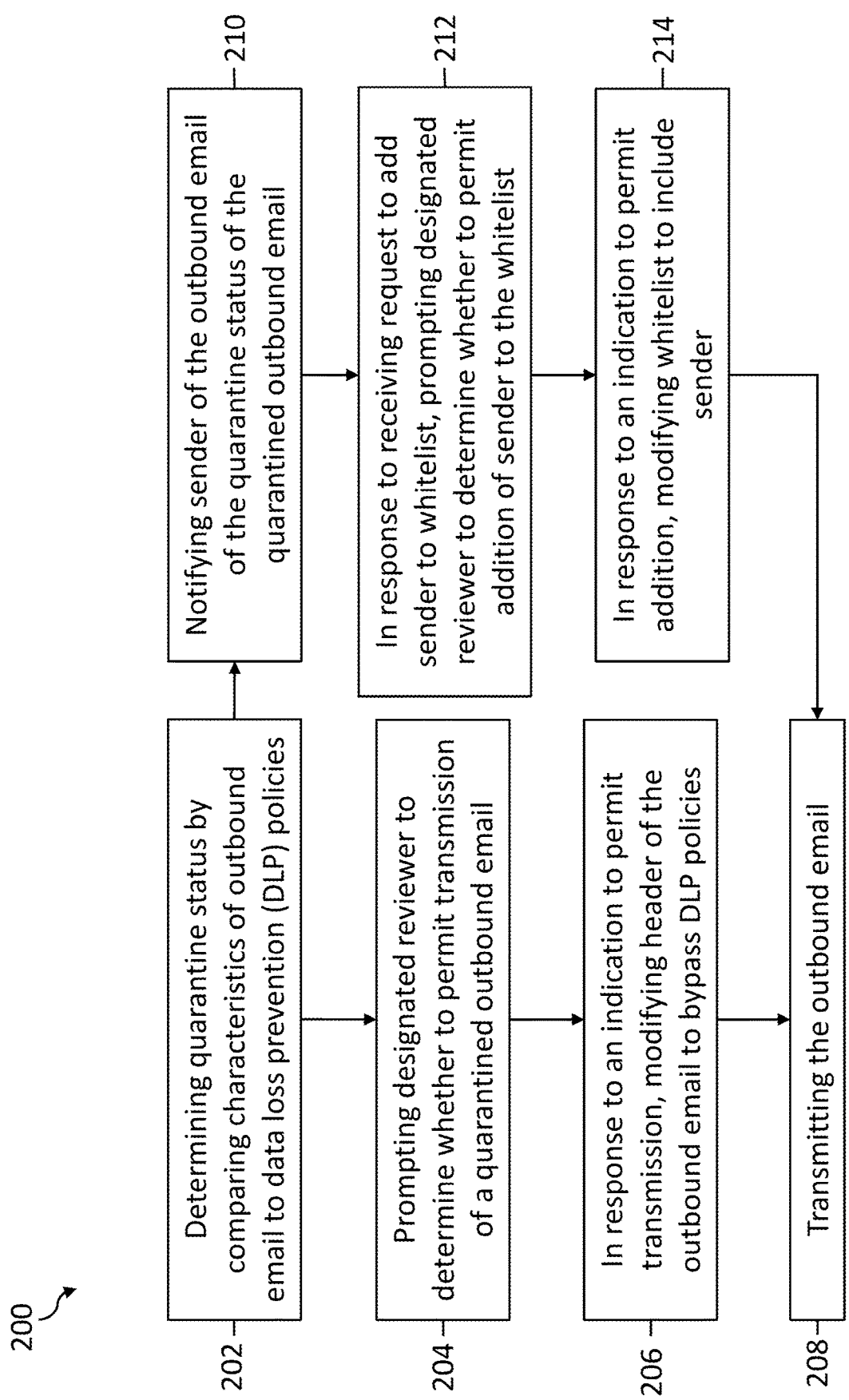
FIG. 2 is a flow diagram of a method for determining quarantine statuses of outbound emails, in accordance with certain embodiments.

FIG. 2 is a flow diagram of a method 200 for determining quarantine statuses of outbound emails, in accordance with certain embodiments. In a non-limiting example, the method 200 is performed, at least in part, by the OEQ tool 104 of FIG. 1, the system 300 of FIG. 3, or the computer system 400 of FIG. 4. The method 200 includes determining a quarantine status of an outbound email (202), prompting a designated reviewer to determine whether to permit transmission of a quarantined outbound email (204), modifying a header of the outbound email to bypass DLP policies in response to the designated reviewer indicating to permit transmission (206), transmitting the outbound email (208), notifying a sender of the quarantine status of the quarantined outbound email (210), prompting the designated review to determine whether to permit addition of the sender to a whitelist (212), and modifying the whitelist to include the sender in response to an indication to permit the addition (214).

In a non-limiting example, the method 200 includes receiving the outbound email (e.g., the outbound email 102) using techniques as described with respect to FIG. 1. In a non-limiting example, the method 200 also includes determining an initial quarantine status of the outbound email by comparing characteristics of the outbound email to one or more DLP policies (e.g., the DLP policies 106). For example, in response to characteristics of a header of the outbound email indicating that a sender of the outbound email is identified by a whitelist, the method 200 includes one or more of modifying the quarantine status of the outbound email to indicate that the outbound email is unquarantined or cleared, or modifying a clearance flag of the outbound email to indicate the outbound email is cleared to bypass the remaining DLP policies. In another example, in response to the characteristics of the outbound email complying with each of the DLP policies, the method 200 includes modifying the quarantine status to indicate that the outbound email is unquarantined. In response to one or more of the characteristics of the outbound email contravening at least one of the DLP policies, the method 200 includes modifying the quarantine status to indicate that the outbound email is quarantined. In a non-limiting example, in response to one or more of the quarantine status indicating the outbound email is unquarantined or cleared, the clearance flag of the outbound email indicating that the outbound email is cleared, or identification of the sender by the whitelist, the outbound email is allowed to pass through the gateway to networks external to the organization as an email transmission (e.g., email transmission 108).

Additionally, in a non-limiting example, the method 200 includes retrieving identifying information of the designated reviewer from configuration management data (e.g., the configuration management data 112) based on identifying information of the sender of the outbound email. The method 200 also includes prompting the designated reviewer using the identifying information to determine whether to permit transmission of an outbound email in response to the quarantine status indicating that the outbound email is quarantined. In response to an indication from the designated reviewer to permit transmission of the outbound email, the method 200 also includes modifying a header of the outbound email to bypass the DLP policies. For example, the method 200 includes modifying the header to include the quarantine status of the outbound email. In another example, the header includes a clearance flag. In a non-limiting example, in response to the indication from the designated reviewer to permit transmission of the outbound email, the method 200 includes modifying the clearance flag to indicate to bypass the DLP policies. In response to the clearance flag indicating to bypass the DLP policies, the method 200 includes transmitting the outbound email.

In a non-limiting example, the method 200 also includes duplicating an original email received from the sender to generate the outbound email. Additionally, in response to the clearance flag indicating to bypass the DLP policies, the method 200 includes transmitting the outbound email using an impersonation privilege.

The method 200 additionally includes transmitting a notification to the sender in response to the quarantine status indicating that the outbound email is quarantined. The notification may include the quarantine status of the outbound email, one or more actions available to the sender based on the quarantine status, an identity of the designated reviewer for the outbound email, or a combination thereof. For example, the notification may include a graphical user interface that enables the sender to request to be added to a whitelist. The method 200 also includes receiving the request from the sender to be added to a whitelist. In response to receiving the request, the method 200 includes prompting the designated reviewer to determine whether to permit addition of the sender to the whitelist. The method 200 includes modifying the whitelist to include the sender in response to an indication from the designated reviewer to permit the addition. Additionally, the method 200 includes transmitting the outbound email without the modified header in response to the indication from the designated reviewer to permit the addition. In a non-limiting example, in response to the indication from the designated reviewer to permit the addition, the method 200 includes modifying the quarantine status to cleared to bypass the DLP policies. In another non-limiting example, in response to the indication from the designated reviewer to permit the addition, the method 200 includes modifying the clearance flag of the header of the outbound email to indicate to bypass the DLP policies.

Figure 3:
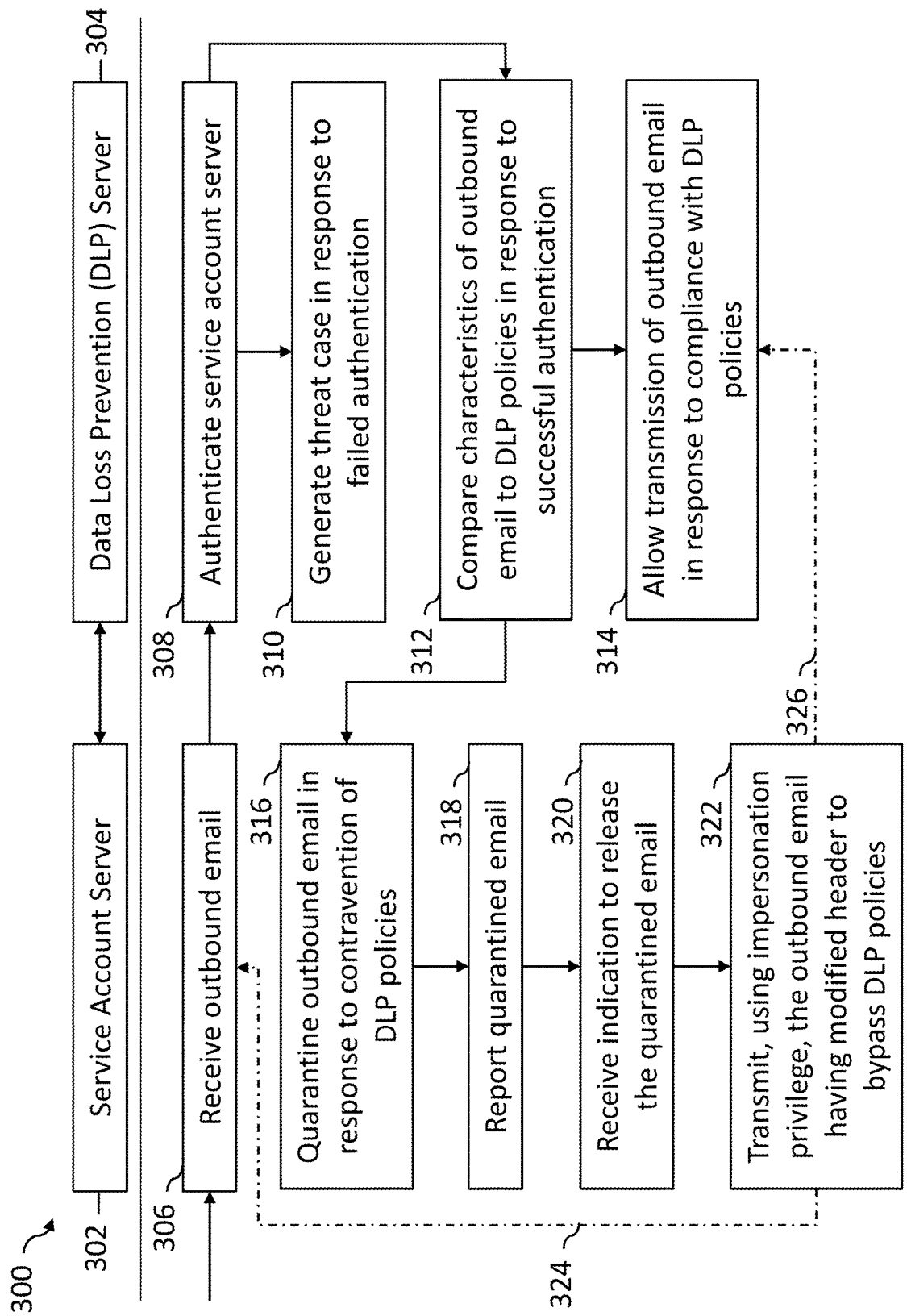
FIG. 3 is a block diagram of a system for determining quarantine statuses of outbound emails, in accordance with certain embodiments.

FIG. 3 is a block diagram of a system 300 for determining quarantine statuses of outbound emails, in accordance with certain embodiments. In a non-limiting example, the system 300 is used by an OEQ tool (e.g., the OEQ tool 104 of FIG. 1) for determining quarantining statuses of outbound emails. In another non-limiting example, the system 300 is used by a method (e.g., the method 200 of FIG. 2) for determining quarantining statuses of outbound emails. The system 300 includes a service account server 302 to transmit an outbound email having a modified header to bypass the one or more DLP policies in response to an indication from a designated reviewer to permit transmission of the outbound email having a quarantine status indicating that the outbound email is quarantined, wherein the designated reviewer is determined based on a sender of the outbound email. The system 300 also includes to a data loss prevention (DLP) server 304 to provide access to one or more DLP policies. The service account server 302, the DLP server 304, or a combination thereof, may be implemented by a computer system, as described with respect to FIG. 4, for example.

In a non-limiting example, the service account server 302 and the DLP server 304 perform different steps for determining quarantine statuses. For example, the service account server 302 receives an outbound email (306), quarantines the outbound email in response to a contravention of DLP polices (316), reports the quarantined email (318), receives an indication to release the quarantined email (320), and transmits, using an impersonation privilege, the outbound email having a modified header to bypass the DLP polices (322); and the DLP server 304 authenticates the service account server (308), generates a threat case in response to a failed authentication (310), compares characteristics of the outbound email to the DLP policies in response to a successful authentication (312), and allows transmission of the outbound email in response to compliance with DLP policies (314).

In a non-limiting example, the service account server 302 receives the outbound email (e.g., the outbound email 102) using techniques as described with respect to FIG. 1. In response to receiving the outbound email, in a non-limiting example, the service account server 302 determines an initial quarantine status for the outbound email. The initial quarantine status may be specified by an owner or administrator of the system 300. For example, the service account server 302 performs one or more of modifying the quarantine status of the outbound email to quarantined, or modifying a clearance flag of a header of the outbound email to indicate the outbound email is not cleared to bypass the DLP policies. In another example, the service account server 302 performs one or more of modifying the quarantine status of the outbound email to unquarantined, or modifying a clearance flag of a header of the outbound email to indicate the outbound email is cleared to bypass the DLP policies.

The service account server 302 transmits an identifier of the service account server 302 or other authentication information associated with the service account server 302 to the DLP server 304 in response to receiving the outbound email. In a non-limiting example, the DLP server 304 determines whether the identifier of the service account server 302 or the other authentication information associated with the service account server 302 is authentic by comparing the identifier to a specified identifier associated with a trusted service account server 302 or by comparing the other authentication information to other specified data associated with a trusted electronic device. The other authentication information may be an encrypted key, for example. In a non-limiting example, the service account server 302 may be stored to a vault of a Privileged Access Management (PAM) solution, or other like accessibility solution limiting actions based on security privileges, and the DLP server 304 may authenticate the service account server 302 via a multi-factor authentication process specified by the PAM solution. In response to a determination that the identifier is not authentic, the DLP server 304 generates the threat case. The threat case may include the outbound email, the identifier of the service account server 302 or other authentication information associated with the service account server 302, or other characteristics associated with the transmission of the outbound email (e.g., source IP address, destination IP address, or the like), or a combination thereof. In a non-limiting example, the DLP server 304 transmits the threat case to a designated reviewer. The designated reviewer may be a designated reviewer associated with a sender of the outbound email, a designated reviewer associated with one or more of managing threat cases for the organization, for a specified department or group of the organization, for a specified type of data, or a combination thereof. In a non-limiting example, the DLP server 304 retrieves identifying information for the designated reviewer from a database (e.g., database storing the configuration management data 112). In a non-limiting example, the threat case may enable the designated reviewer to select a second designated reviewer. In a non-limiting example, in response to receiving an indication that the designated reviewer has selected the second designated reviewer from a list of authorized designated users displayed in the prompt, the DLP server 304 may transmit identifying information of the second designated reviewer to a delegation engine (e.g., the delegation engine 110) to store the second designated reviewer as associated with the threat case as configuration management data. The system 300 may include the delegation engine or be communicatively coupled to the delegation engine. The system 300 may include a computer-readable medium (e.g., a configuration management database) or may be communicatively coupled to another system including the computer-readable medium. The computer-readable medium stores data associating the designated reviewer to the sender of the outbound email, one or more threat cases, a specified department or group, a specified type of data, or a combination.

In response to a determination that the identifier or other authentication information associated with the service account server 302 is authentic, the DLP server 304 compares characteristics of the outbound email to DLP policies (e.g., the DLP policies 106). In a non-limiting example, the DLP polices are stored to a DLP database. The system 300 may include the DLP database or be communicatively coupled to another system including the DLP database. In response to a determination that the characteristics of the outbound email complies with the DLP policies, the DLP server 304 allows transmission of the outbound email. In a non-limiting example, the DLP server 304 manages the gateway to networks that are external to the organization. In response to one or more of the quarantine status indicating the outbound email is unquarantined or cleared, the clearance flag of the outbound email indicating that the outbound email is cleared, or identification of the sender by the whitelist, the DLP server 304 enables the outbound email to pass through the gateway to networks external to the organization as an email transmission (e.g., email transmission 108), for example.

In a non-limiting example, in response to a determination that one or more of the characteristics of the outbound email contravenes one or more of the DLP policies, the DLP server 304 transmits an indication to the service account server 316 to indicate that the outbound email is quarantined. In a non-limiting example, the DLP server 304 modifies the quarantine status of the outbound email to indicate that the outbound email is quarantined. In another non-limiting example, the service account server 326 modifies the quarantine status of the outbound email to indicate that the outbound email is quarantined in response to receiving the indication from the DLP server 304. In response to the quarantine status indicating that the outbound email is quarantined, in a non-limiting example, the service account server 302 prompts the designated reviewer to determine whether to permit transmission of the outbound email having the quarantine status indicating that the outbound email is quarantined. In response to an indication from the designated reviewer to permit transmission of the outbound email, the service account server 302 generates a duplicate of the outbound email having a modified header to bypass the one or more DLP policies and replaces the original outbound email with the duplicate. The service account server 302 may modify a clearance flag to indicate that the outbound email is cleared to bypass, for example. The service account server 302 transmits the outbound email having the modified header using an impersonation privilege. In a non-limiting example, the transmitted outbound email is received by the service account server 302 at 306 via a path 324 and transmitted after the DLP server 304 authenticates the service account server and determines that the clearance flag indicates the outbound email is cleared to bypass. In another non-limiting example, the transmitted outbound email is received by the DLP server 304 at 314 via a path 326 for transmission.

The steps of the method 200, the steps performed by the system 100, the system 300, or a combination thereof, may be executed by one or multiple computer applications. The steps of the method 200, performed by the system 100, the system 300, or the combination thereof, may be executed in any order, and in any combination, and may individually be executed one or more times. As a non-limiting example, step 202 may be executed six (6) times followed by three (3) executions of step 204, followed by executions of step 202 two (2) times then executions of step 206 three (2) times, step 204 one (1) time, step 206 one (1) time, step 208 one (1) time, and step 210 one (1) time.

System 100, method 200, and system 300 may each be partially or wholly implemented, in any combination, as part of an OEQ tool or multiple OEQ tools used by one or more organizations for ensuring the security and protection of sensitive information of an organization and, more particularly, to systems and methods for determining quarantine statuses of outbound emails sent by users of the organization's email systems. While the examples described herein refer to a single organization, one skilled in the art will recognize that the OEQ tool described herein may provide services to multiple organizations. In a non-limiting example, multiple user systems from multiple organizations may transmit requests for OEQ services via multiple service account servers. The OEQ tool may include multiple DLP policy databases, one or more for each organization of the multiple organizations. Processing a request for an OEQ service may include identifying an organization associated with the request. The OEQ tool may use the organization identifier to determine a relevant DLP policy to use in processing the request, a DLP policy database to use in processing the request, a configuration management database to use in processing the request, or a combination thereof. Using the OEQ tool described herein enhances a maturity of an organization's cybersecurity policy by addressing risks of unauthorized email disclosures. Additionally, the OEQ tool prevents damage to reputation and image caused by unauthorized email disclosures.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-usable storage medium (e.g., computer-readable medium) having computer-readable program code (e.g., computer-executable instructions) on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 45 U.S.C. § 101 (such as a propagating electrical or electromagnetic signal per se). As an example and not by way of limitation, a computer-readable storage media may include a semiconductor-based circuit or device or other integrated circuit (IC) (such as, for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational blocks to be performed on the computer or other programmable apparatus to produce a computer-implemented process such that the instructions which execute on the computer or other programmable apparatus provide blocks for implementing the functions specified in the flowchart block or blocks.

FIG. 4 is a block diagram of a computer system that can be employed to execute a system or method for determining quarantine statuses of outbound emails, in accordance with certain embodiments described. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. Dual microprocessors and other multiprocessor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 440, respectively.

The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 412, including operating system 432, one or more computer application programs 434, other program modules 436, and program data 438. In some examples, the computer application programs 434 can include one or more sets of computer-executable instructions of the OEQ tool 104, one or more sets of computer-executable instructions of the service account server 302, or one or more sets of computer-executable instructions of the DLP server 304, and the program data 438 can include the outbound email 102, DLP policies, or the configuration management data. The computer application programs 434 and program data 438 can include functions and methods programmed to perform the methods of determining quarantine statuses of outbound emails, such as shown and described herein.

A user may enter commands and information into computer system 400 through one or more input devices 440, such as a pointing device (e.g., a mouse, touch screen), keyboard, microphone, joystick, game pad, scanner, and the like. For instance, the user can employ input device 440 to edit or modify the OEQ tool 104, the service account server 302, the DLP server 304, the DLP policies, or the outbound email 102. These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and a wide area network (WAN). When used in a LAN networking environment, computer system 400 can be connected to the local network through a network interface or adapter 452. When used in a WAN networking environment, computer system 400 can include a modem, or can be connected to a communications server on the LAN. The modem, which may be internal or outbound, can be connected to system bus 406 via an appropriate port interface. In a networked environment, computer application programs 434 or program data 438 depicted relative to computer system 400, or portions thereof, may be stored in a remote memory storage device 454.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, blocks, operations, elements, and/or components, but do not preclude the presence or addition of one or more other features, integers, blocks, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the description has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the description without departing from the essential scope thereof. Therefore, it is intended that the invention not be limited to the particular embodiments described, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A non-transitory computer-readable medium storing an outbound email quarantine (OEQ) tool comprising computer-executable instructions, which, when executed by a processor, cause the processor to:
determine a quarantine status by comparing characteristics of an outbound email to one or more DLP policies;
modify the quarantine status to indicate that the outbound email is quarantined in response to a determination that one or more of the characteristics of the outbound email contravenes at least one of the one or more DLP policies;
modify the quarantine status to indicate that the outbound email is unquarantined in response to a determination that the characteristics of the outbound email are permitted by the one or more DLP policies;
prompt a designated reviewer to determine whether to permit transmission of the outbound email in response to the quarantine status of the outbound email indicating that the outbound email is quarantined, wherein the designated reviewer is determined based on characteristics of the outbound email;
generate the outbound email in response to an indication from the designated reviewer to permit transmission of the outbound email;
modify a header of the outbound email to bypass the one or more DLP policies in response to an indication from the designated reviewer to permit transmission of the outbound email; and
transmit the outbound email having the modified header using an impersonation privilege, wherein the outbound email is a duplicate of an original email.

2. The non-transitory computer-readable medium storing the OEQ tool of claim 1, wherein the processor is further operable to:
modify the quarantine status to indicate that the outbound email is cleared in response to an indication from the designated reviewer to permit the outbound email.

3. The non-transitory computer-readable medium storing the OEQ tool of claim 2, wherein the processor is further operable to transmit a notification including the quarantine status to the sender in response to a modification to the quarantine status.

4. The non-transitory computer-readable medium storing the OEQ tool of claim 3, wherein the processor is further operable to:
receive a request from the sender to be added to a whitelist, wherein the whitelist is a DLP policy of the one or more DLP policies;
prompt the designated reviewer to determine whether to permit addition of the sender to the whitelist;
modify the quarantine status to indicate that the outbound email is unquarantined in response to the designated reviewer permitting the addition; and
transmit the outbound email without the modified header in response to the quarantine status indicating that the outbound email is unquarantined.

5. A method comprising:
determining a quarantine status by comparing characteristics of an outbound email to one or more DLP policies;
modifying the quarantine status to indicate that the outbound email is quarantined in response to a determination that one or more of the characteristics of the outbound email contravenes at least one of the one or more DLP policies; and
modifying the quarantine status to indicate that the outbound email is unquarantined in response to a determination that the characteristics of the outbound email are permitted by the one or more DLP policies;
prompting a designated reviewer to determine whether to permit transmission of the outbound email in response to the quarantine status indicating that the outbound email is quarantined, wherein the designated reviewer is determined based on a characteristic of the outbound email;
generate the outbound email in response to an indication from the designated reviewer to permit transmission of the outbound email;
modifying a header of the outbound email to bypass the one or more DLP policies in response to an indication from the designated reviewer to permit transmission of the outbound email; and
transmitting the outbound email having the modified header using an impersonation privilege, wherein the outbound email is a duplicate of an original email.

6. The method of claim 5, further comprising:
receiving a request from the sender to be added to a whitelist, wherein the whitelist is a DLP policy of the one or more DLP policies;
prompting the designated reviewer to determine whether to permit addition of the sender to the whitelist;
modifying the whitelist to include the sender in response to an indication from the designated reviewer to permit the addition; and
transmitting the outbound email without the modified header in response to the indication from the designated reviewer to permit the addition.

7. A system, comprising:
a data loss prevention (DLP) server, implemented by the at least one processor, to provide access to one or more DLP policies; and
a service account server, implemented by at least one processor, to:
determine a quarantine status by comparing characteristics of an outbound email to the one or more DLP policies;
modify the quarantine status to indicate that the outbound email is quarantined in response to a determination that one or more of the characteristics of the outbound email contravenes at least one of the one or more DLP policies; and
modify the quarantine status to indicate that the outbound email is unquarantined in response to a determination that the characteristics of the outbound email are permitted by the one or more DLP policies;
prompt a designated reviewer to determine whether to permit transmission of the outbound email having a quarantine status indicating that the outbound email is quarantined, wherein the designated reviewer is determined based on a characteristic of the outbound email;
generate the outbound email having a modified header to bypass the one or more DLP policies in response to the indication from the designated reviewer to permit transmission of the outbound email; and
transmit the outbound email having a modified header using impersonation privilege, wherein the outbound email is a duplicate of an original email.

8. The system of claim 7, wherein the DLP server is further configured to:
authenticate the service account server; and
notify the designated reviewer of a threat case in response to a failed authentication of the service account server.

9. The system of claim 8, further comprising a DLP database storing the one or more DLP policies.

10. The system of claim 9, further comprising:
a configuration management database storing data associating the designated reviewer to the sender; and
a delegation engine to enable the designated reviewer to store a second designated reviewer associated with the sender to the configuration management database.

* * * * *